July 2, 1957 H. A. ENGLE ET AL 2,797,786
INCREMENTAL MOTOR AND STOP THEREFOR
Filed Nov. 22, 1954 3 Sheets-Sheet 1

HOMER A. ENGLE,
HOWARD M. GREENE JR.
INVENTORS.

BY
ATTORNEYS

July 2, 1957   H. A. ENGLE ET AL   2,797,786
INCREMENTAL MOTOR AND STOP THEREFOR
Filed Nov. 22, 1954   3 Sheets-Sheet 2

INVENTOR.
HOMER A. ENGLE,
HOWARD M. GREENE JR.
BY
ATTORNEYS.

HOMER A. ENGLE,
HOWARD M. GREENE, JR.
INVENTORS.

BY

ATTORNEYS.

United States Patent Office 2,797,786
Patented July 2, 1957

2,797,786

INCREMENTAL MOTOR AND STOP THEREFOR

Homer A. Engle, Los Angeles, and Howard M. Greene, Jr., Baldwin Park, Calif., assignors, by mesne assignments, to Viking Industries, Inc., Canoga Park, Calif., a corporation of California Application November 22, 1954, Serial No. 470,298

14 Claims. (Cl. 192—142)

This invention relates to electric motors and, more particularly, to an improvement in systems for permitting the incremental rotation of said motors.

A feature of this invention is the provision of apparatus which may be coupled to a shaft on a motor to enable incremental control of the rotation of that motor.

Another feature of the present invention is the provision of an incremental motor that translates electrical pulses into mechanical rotation of a member such as an output shaft.

Another feature of the present invention is the provision of an incremental motor which is reversible and yet permits positive control of the increment of rotation.

Still a further feature of the present invention is the provision of a motor which is capable of "remembering" its starting position and returning to that starting position despite the continued application of excitation or the removal of that excitation, once the motor has been started. A motor having such characteristics is useful as a control device to effectuate operations in response to signals of a pulse type, such as switching in response to dialing or altering control positions in response to the number of pulses received, as well as their polarity.

These and other objects of the invention are achieved in an electric motor which has a rotor to which an output shaft is coupled by a differential gearing arrangement. The rotor is attached to a second shaft, upon which a cam is attached to be rotatable therewith. A pair of stop means are positioned on either side of the cam and in its rotational path, and they prevent its rotation unless they are moved from the path of the cam. These stop means each include a short member which is positioned adjacent a cam and in the path thereof and a long member which is axially displaced from the short member. The long member has a portion which overlaps the cam. A spring is used to mechanically and resiliently couple the short member and the long member. In one embodiment of the invention a solenoid is positioned to move the short member out of the path of the cam when the solenoid is excited, and the long member is prevented from following the motion of the short member by the presence of the cam. The motor input and each solenoid are coupled electrically in parallel, so that the proper solenoid is excited to permit rotation of the cam. When the cam passes between the long and short members, the spring brings the long member into the position previously occupied by the short member. If the applied pulse is terminated before the completion of a cycle of rotation, the long and short members are returned by a spring to their initial position and the short member serves to stop further rotation of the cam. If the applied excitation is longer than the duration of a cycle of rotation, then the long member is in position to block further rotation of the cam.

The sides of the long and short members which are opposite to those presented to the cam when it is stationary are shaped so that the cam can spread them apart and pass therebetween to return to its initial position between two stop means. Connections from the two solenoids are made so that the proper one is actuated as determined by either the polarity of the applied exciting voltage or, in the case of two separate fields, the field coil excited is connected in parallel with the proper one of the solenoids. Thus, the excited solenoid pulls the short member out of the way of the cam to permit rotation in the predetermined direction of the cam. In this manner, the incremental motor converts an incoming electrical pulse, regardless of its duration, to a preassigned amount of shaft rotation in a direction dictated by the applied pulse. By use of the differential-type gearing, a pulse which has sufficient power or duration to cause the motor rotor to rotate at least 180° from the starting position provides sufficient inertia to enable the motor to complete the cycle of rotation.

In a second embodiment of the invention, an arrangement of gearing is provided in place of the solenoids which operates to actuate the stop means in the same manner as the solenoids, so that a single rotation of the output shaft is obtained for an input pulse to the motor.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
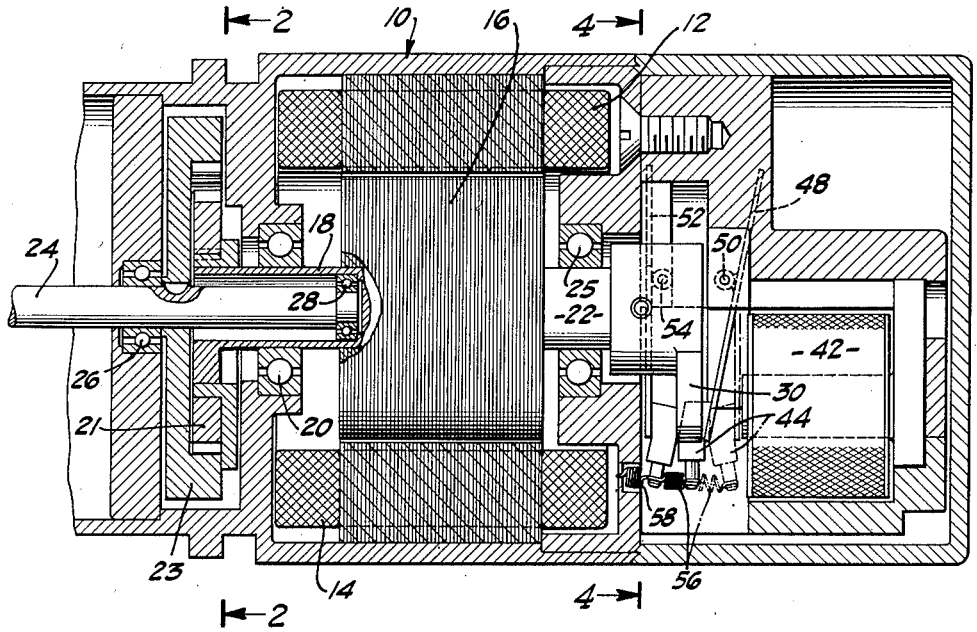
Figure 1 is a cross-sectional view of one embodiment of the invention.
Figure 2:
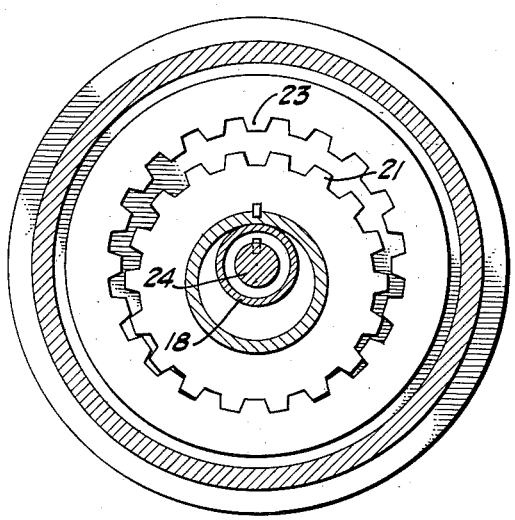
Figure 2 is a view in section along the lines 2—2 of Figure 1 showing the differential gear employed in the embodiment of the invention.
Figure 3:
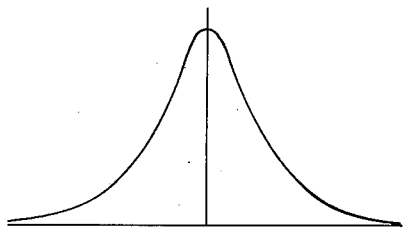
Figure 3 is a curve of the input torque required to drive the motor through one cycle.

Reference is now made to Figure 1, which shows a motor 10, which, by way of example, may be of the split-field winding type, the respective field windings 12, 14 each having a separate input. The rotor 16 drives a shaft which, on one side 18, is hollow and rotates in bearings 20. The other side 22 is solid and rotates in bearings 25. Considering the output-shaft side 18 and also Figure 2, this shaft is eccentric, and rotates and swings a smaller gear 21. This gear 21 in turn meshes with the larger internal gear 23. The larger internal gear is rotated. It is attached to shaft 24, which is journaled in bearings 26, 28 and is concentric with the hollow shaft 18. The curve of the required driving torque for this type of eccentric-gear arrangement is as shown in Figure 3. This curve incidentally, also approximates the angular velocity of the output shaft 24 over a cycle.

Figure 4:
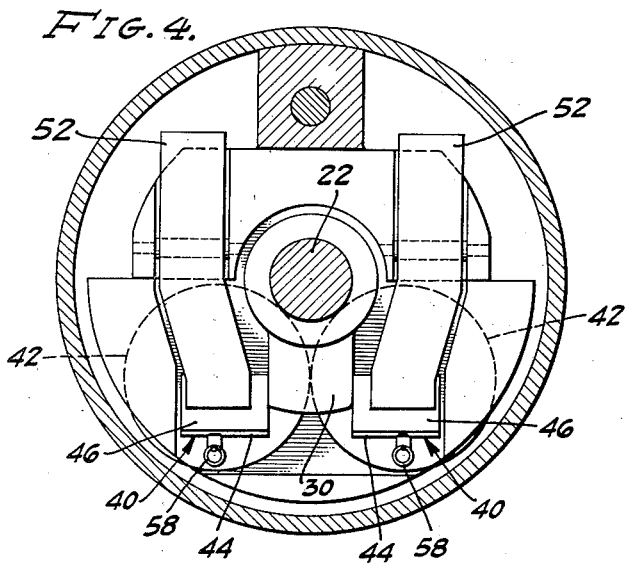
Figure 4 is a view along the lines 4—4 of Figure 1, showing the control arrangement used with the embodiment of the invention.
Figure 5:
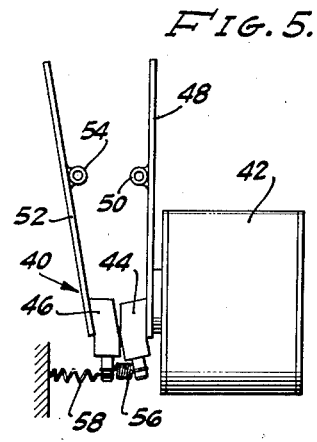
Figure 5 shows the solenoid and stopping elements in position when the solenoid is excited.

Consider now the shaft 22 in Figure 1. It has attached thereto a cam 30 fastened to it and rotating therewith. This cam may also be seen in Figure 4. On either side of the cam, when in its initial or starting position, are stopping means 40. Each of these stopping means includes a solenoid 42, a short stop member 44, and a long stop member 46. The short stop member 44 is pivoted by means of an extension rod 48 about a pivot point 50. The long stop member is pivoted by means of an extension rod 52 about a pivot point 54. As previously pointed out, there are two of these stopping means, one on either side of the cam when in its initial or starting position. The long and short stop members are urged together by means of a spring 56. A second spring 58 serves to maintain both members at an initial position when the solenoid 42 is not excited. The arrangement of the solenoids 42, the cam 30, and the long and short stop members 46, 44 may best be seen in the end view shown in Figure 4. The two solenoids 42 employed are each separately electrically connected in parallel with a different one of the split-field windings. Accordingly, excitation of one of the windings for rotation of the motor also excites one solenoid, which results in an operation to be described infra.

Figure 6:
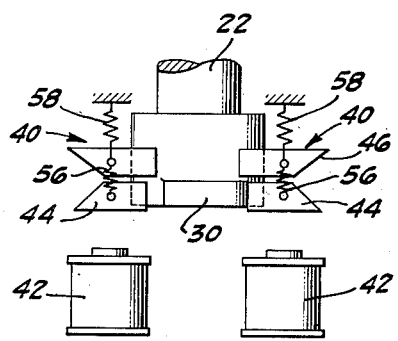
Figures 6 through 9 are views of the control elements employed in the embodiment of the invention showing their positions at various portions of an operating cycle.
Figure 7:
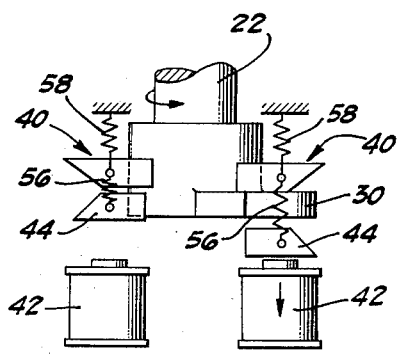

Referring now to Figures 6 through 9, there is seen the operation of the various parts of the incremental control mechanism when the motor is excited. Initially, as shown in Figure 6, the cam rests between the two short stop members and the long stop members overlap a portion of the cam. The long stop member 46 is axially spaced from the short stop member 44. Upon excitation of the field winding, one of the solenoids 42 shown in Figure 7 is also excited. This results in attracting the short stop member 44 to the solenoid. Because of the presence of the cam, the long stop member cannot at first follow the short stop member. The cam is driven by the rotor and can then pass between the short and long stop members. This is shown in Figure 7.

Figure 8:
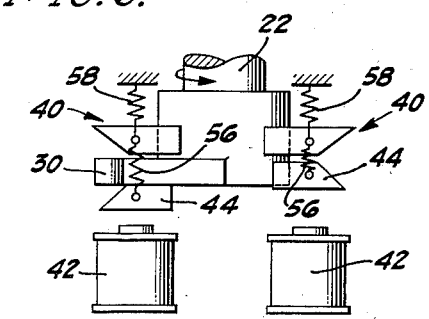
Figure 9:
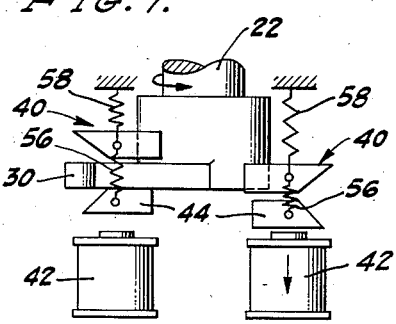

Figure 8 shows the cam almost completing its cycle. The side of the short and long stop members which is away from the cam when it is at rest each have their surfaces planed so that the cam, in returning to the initial position, spreads them apart and passes therebetween. This spreading is enabled by reason of the spring which separates the long and short stop members. If the pulse, which has been applied to the motor, terminates before the cam is rotated through a complete cycle, the spring 58 returns the long and short stop members to their initial position and the cam is stopped by striking the short stop member 44. Any bounceback is immediately halted by the other short stop member 44, which has regained its initial position by operation of the spring 56. If the pulse applied to the motor is not terminated at the time the cam has completed its cycle, the long stop member, by reason of the action of the spring 56, is pulled into position to stop the cam, and even though the solenoid is still acting upon the stopping means the cam is trapped between the long stop member and the other short stop member. In this manner, the rotor can only make one complete revolution. The short pulse must exceed in duration the time taken for half a revolution. Once it does this, the inertia of the device completes the cycle. The motor, therefore, is one with a memory—that is, it remembers its initial position and comes back to that position, regardless of how long the applied pulse or how short, providing it is not less than one-half the duration of the rotation. By reason of the differential gearing output, any bounce or "backlash" is substantially eliminated, since the output shaft motion at the beginning or end of a cycle, as shown by Figure 3, is extremely small.

The embodiment of the invention has been described, employing a split-field motor. It will be readily appreciated that this is not necessary. Any system wherein the input to the motor is applied in two paths to determine its direction of rotation may be employed. A D. C. motor may be employed, if desired. The two solenoids may be excited by the input to the field winding. If two field windings are employed, the situation is handled as is described herein. If a single-field winding is employed and motor direction is controlled by reversing current applied, rectifiers can be employed and connected in series with the solenoids so that one or the other is excited to enable the motor to rotate.

Figure 10:
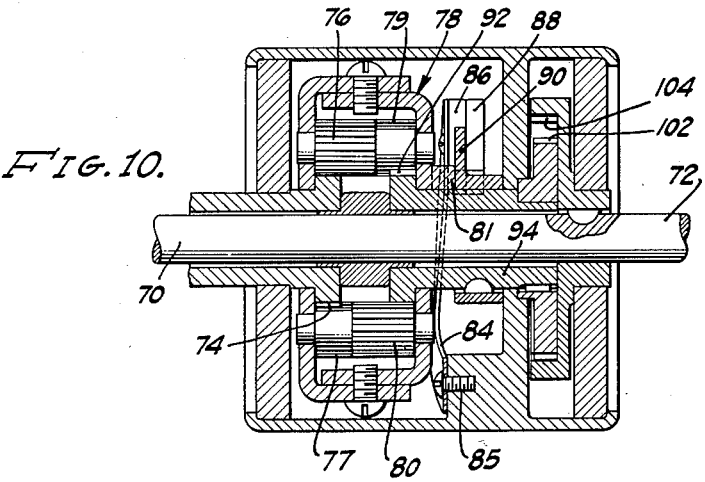
Figure 10 is a cross section of a mechanical embodiment of the invention.
Figure 11:
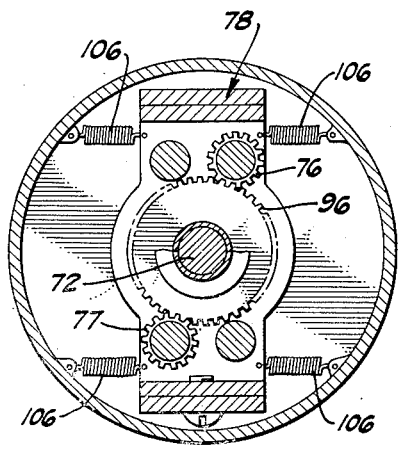
Figure 11 is a view in section of the drawing of Figure 10, showing the gearing arrangement for actuating the stop members.
Figure 12:
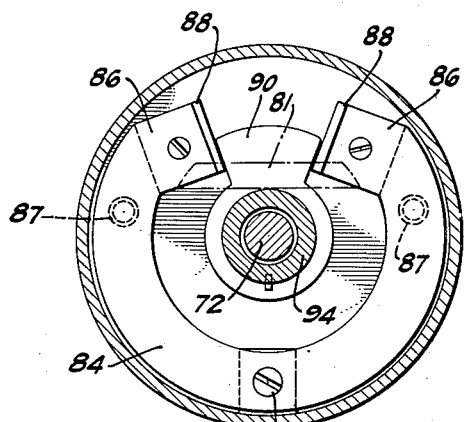
Figure 12 is a view in section of Figure 10, showing details of a spring member used to actuate the stop members.
Figure 13:
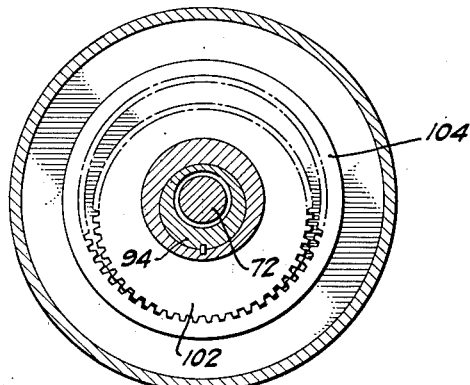
Figure 13 is a view in section of the output gearing arrangement.

Reference is now made to Figures 10, 11, and 12, which are respectively views in section of another embodiment of the invention which may be considered the mechanical form of the invention described previously herein. Essentially, the operation of the turkey-tail cam and stop members is the same as was described for Figures 6 through 9. However, in the embodiment of the invention shown in Figures 10 through 12, the force which is used to lift or separate a short member from a long member to permit passage of the cam between them is a mechanical one rather than an electrical one.

Figure 10 shows a cross section of a housing 78, which encloses differential gearing for the mechanical operating system. An electric motor (not shown here) receives an electrical pulse and, in response thereto, applies a rotating force to its shaft (also not shown). This shaft is coupled to a hollow shaft 70, within which output shaft 72 is supported rotatably by bearings. The hollow shaft 70 is connected to a gear 74, which is rotatably driven thereby. As may better be seen in Figure 11, this gear 74 drives two second gears 76, 77, which are rotatably mounted within a housing 78 which, itself, is mounted to be capable of a limited amount of rotation in either direction. The second gears 76, 77 drive two third gears 79, 80. These, in turn, drive a fourth gear 92, which is mounted on a hollow shaft 94. The hollow shaft 94 drives another gear 102, which is mounted to eccentrically drive the inner gear 104. The gear 104, in turn, drives the output shaft 72, to which it is keyed.

The housing 78, as previously described, is mounted so that it is capable of being driven through a limited arc. A mechanical stop, not shown, limits the housing rotation. It carries a cam 81, which can be called a riser cam. A somewhat U-shaped leaf spring member 84 is fastened at its bottom by a bolt 85. Adjacent the bolt and on either side, the spring is bowed so that when the housing is rotated the cam riser pushes against the bowed portion and forces back the upper end of one arm of the U. Of course, the direction of rotation of the housing determines which arm is forced back by action of the riser cam. The upper end of each arm of the U carries a short stop member and a long stop member supportably attached thereto by a spring in substantially the same manner as described in the previous embodiment of the invention. Torsion spring members 87 are attached to either side of the leaf spring 84, and serve to return it to its unoperated position, and, by thus pushing on the riser cam, aid the return of the housing to its neutral position when excitation is removed from the driving motor. Springs 106, as seen in Figure 11, return the housing to its neutral position when the driving motor is not excited. The bowed spring member, in being pressed, operates to move a short member 86 away from a long member 88. The turkey-tail cam 90, which is mounted on the hollow shaft 94, is thus free to pass between a long and short member in a direction determined by the polarity of the pulse applied to the driving motor. The limited housing rotation occurs only when there is a load on the output shaft. When there is no load thereon, the gears in the housing immediately commence being driven without transmitting back any energy to move the housing carrying the gears. The blocked turkey-tail cam provides a suffiicent load for such purpose. Accordingly, it may readily be seen that the output drive from the motor which has received an electrical pulse is communicated mechanically to (1) separate the long and short members to permit the turkey-tail cam to pass therebetween, and (2) to drive the output shaft by means of the gearing arrangement. The cam 90 rotates and pushes apart the two stop members by reason of the cammed back edges in the same manner as previously described and is brought to a stop by either the long or short stop member of the succeeding stop member set. It will be readily appreciated, therefore, that the operation of the mechanical system is substantially identical with the electrical system, there merely being a substitution of a differential gearing arrangement for the solenoid members. Although in the embodiment shown the riser cam pushes against the U-shaped leaf spring to actuate the short members, other ways of actuating the short members may be used, such as by applying the riser cam force either directly or indirectly to the short member and still be within the scope of this invention.

Although there are two stop means employed in the embodiments of the invention described, one may be used, if desired. Furthermore, if less than one cycle of rotation is desired, more than two of the stop means may be used, spacing them at the desired stopping points along the path of rotation of the cam.

Accordingly, the system shown and described herein is for an incremental rotational device. It is novel and useful and extremely simple in construction and operation.

We claim:

1. An incremental motor having a rotor and means to limit the number of rotations of said rotor including a shaft coupled to said rotor to be driven thereby, a cam mounted on said shaft and rotatable therewith, stop means positioned on either side of said cam and in its path of rotation, each said stop means including a short stop member normally postiioned in the path of said cam, a long stop member spaced therefrom, means to move said short stop member out of the path of said cam to provide a space between said long and short stop members between which said cam can pass, and means to move said long stop member in the path of said cam after it has passed between said members.

2. An incremental motor as recited in claim 1 wherein said means to move said short stop member includes a riser cam, means to move said riser cam responsive to excitation of said motor, and means attached to said short stop member actuated by said riser cam being moved to move said short stop member out of the path of said cam.

3. An incremental motor as recited in claim 1 wherein each of said short stop members is normally positioned adjacent said cam, each of said long stop members is positioned axially of said short stop member and overlapping said cam, and said means to move said long stop member is a spring coupling said long stop member to said short stop member.

4. An incremental motor as recited in claim 1 wherein said motor is of the split field type, each of said means to move said short stop member is a solenoid, and each of said solenoids is connected in parallel with one of said split fields to be excited simultaneously therewith.

5. An incremental motor as recited in claim 3 wherein each of said short and long stop members have their sides, which are away from said cam when it is in its stop position between said members, cam shaped to be moved apart by said cam moving against them and toward its stop position.

6. An incremental motor having a rotor, a first output shaft, differential gearing coupling said first output shaft to said rotor, a second output shaft coupled to said rotor to be rotatable therewith, a cam mounted on said second output shaft to be rotatable therewith, a pair of movable stops each positioned on either side of said cam to prevent rotation thereof, means to apply excitation to said motor to cause said rotor to rotate in a desired direction, means responsive to the excitation of said motor by said means to apply excitation to move one of said pair of movable stops to permit rotation in said desired direction, and means adapted to move said other of said pair of stops to permit said cam to complete a cycle of rotation.

7. An incremental motor having a rotor, a first output shaft, differential gearing coupling said first output shaft to said rotor, a second output shaft coupled to said rotor to be rotatably driven thereby, a cam mounted on said second shaft to be rotatable therewith, movable stop means positioned on either side of said cam, each said movable stop means including a short stop member adjacent said cam and in its path of rotation, a long stop member axially displaced from said short stop member and having a portion thereof overlapping said short stop member, spring means yieldably coupling said long and short stop members, solenoid means positioned adjacent said short stop member to move said short stop member out of the path of rotation of said cam when excited, each said short and long stop members having their sides opposite the ones presented to said cam in the stop position cammed to be moved apart upon pressure by said cam when completing a cycle of rotation, and means to apply excitation to drive said rotor in a desired direction and to excite the one of said solenoid means which permits rotation of said cam in said desired direction.

8. An incremental motor having a rotor, a differential gearing means coupled to be driven by said rotor, a riser cam member, means to actuate said riser cam responsive to said differential gearing means being driven, a shaft coupled to be driven by said differential gearing, a second shaft coupled to said rotor to be rotatably driven thereby, a stopping cam mounted on said second shaft to be rotatable therewith, a pair of movable stops each positioned on either side of said stopping cam to prevent rotation thereof, means to apply excitation to said motor to cause said rotor to rotate in a desired direction, whereby said differential gearing means is driven, means to move one of said pair of movable stops out of the path of rotation of said stopping cam responsive to actuation of said riser cam to enable rotation in said desired direction, and means adapted to move said other of said pair of stops to permit said stopping cam to complete a cycle of rotation.

9. An incremental rotor as recited in claim 8 wherein said means to actuate said riser cam member responsive to said differential gearing being driven includes a housing carrying and enclosing said differential gearing, said housing being mounted for limited rotation, said riser cam member being mounted on said housing.

10. An incremental motor having a rotor, a rotatably mounted first shaft coupled to said rotor, a differential gearing means coupled to be driven by said first shaft, a second shaft coupled to be driven by said differential gearing means, a housing enclosing and carrying said differential gearing means, said housing being supported for limited rotation, a riser cam member carried by said housing, a stopping cam carried by said second shaft to be rotatable therewith, movable stop means positioned on either side of said stopping cam in the path of its rotation, each said stop means including a short stop member adjacent said stopping cam in its path of rotation, a long stop member axially displaced from said short stop member and having a portion thereof overlapping said short stop member, spring means yieldably coupling said long and short stop members, and means responsive to motion of said riser cam member by said housing to move one of said short stop members out of the path of rotation of said stopping cam, each said short and long stop members having their sides opposite the ones presented to said stopping cam in the stop position cammed to be moved apart by pressure from said stopping cam upon completing a cycle of rotation.

11. A system for limiting the rotation of a motor comprising a shaft, means to mechanically couple said shaft to said motor to be driven by said motor, a cam mounted on said shaft and rotatable therewith, stop means positioned on either side of said cam and in its path of rotation, each said stop means including a short stop member normally positioned in the path of said cam, a long stop member spaced therefrom, means to move said short stop member out of the path of said cam to provide a space between said long and short stop members between which said cam can pass, and means to move said long stop member in the path of said cam after it has passed between said members.

12. A system for limiting the rotation of a motor comprising a shaft, means to couple said shaft to said motor to be rotatably driven thereby, a cam mounted on said shaft to be rotatable therewith, movable stop means positioned on either side of said cam, each said movable stop means including a short stop member adjacent said cam and in its path of rotation, a long stop member axially displaced from said short stop member and having a portion thereof overlapping said short stop member, spring means yieldably coupling said long and short stop members, solenoid means positioned adjacent said short stop member to move said short stop member out of the path of rotation of said cam when excited, each said short and long stop members having their sides opposite the ones presented to said cam in the stop position cammed to be moved apart upon pressure by said cam when completing a cycle of rotation, and means to apply excitation to drive said rotor in a desired direction and to excite the one of said solenoid means which permits rotation of said cam in said desired direction.

13. A system for limiting the rotation of a motor comprising a differential gearing means to couple said gearing means to said motor to be driven thereby, a riser cam member, means to actuate said riser cam responsive to said differential gearing means being driven, a shaft coupled to be driven by said differential gearing, a stopping cam mounted on said shaft to be rotatable therewith, a pair of movable stops each positioned on either side of said stopping cam to prevent rotation thereof, means to apply excitation to said motor to cause said rotor to rotate in a desired direction, whereby said differential gearing means is driven, means to move one of said pair of movable stops out of the path of rotation of said stopping cam responsive to actuation of said riser cam to enable rotation in said desired direction, and means adapted to move said other of said pair of stops to permit said stopping cam to complete a cycle of rotation.

14. A system for limiting the rotation of a motor comprising a rotatably mounted first shaft, means to couple said shaft to said motor to be driven thereby, a differential gearing means coupled to be driven by said first shaft, a second shaft coupled to be driven by said differential gearing means, a housing enclosing and carrying said differential gearing means, said housing being supported for limited rotation, a riser cam member carried by said housing, a stopping cam carried by said second shaft to be rotatable therewith, movable stop means positioned on either side of said stopping cam in the path of its rotation, each said stop means including a short stop member adjacent said stopping cam in its path of rotation, a long stop member axially displaced from said short stop member and having a portion thereof overlapping said short stop member, spring means yieldably coupling said long and short stop members, and means responsive to motion of said riser cam member by said housing to move one of said short stop members out of the path of rotation of said stopping cam, each said short and long stop members having their sides opposite the ones presented to said stopping cam in the stop position cammed to be moved apart by pressure from said stopping cam upon completing a cycle of rotation.

References Cited in the file of this patent

UNITED STATES PATENTS

| 2,512,738 | Dixon et al. | June 27, 1950 |
| 2,547,475 | Larsen | Apr. 3, 1951 |
| 2,554,436 | Wettels | May 22, 1951 |